United States Patent [19]

Rouffet et al.

[11] Patent Number: 5,410,731

[45] Date of Patent: Apr. 25, 1995

[54] SATELLITE TELECOMMUNICATIONS FACILITY CAPABLE OF COVERING A PLURALITY OF COVERAGE AREAS

[75] Inventors: Denis Rouffet, Boulogne Billancourt; Alain Bailly, Ramonville Saint Agne; Gérard Boucheret, Toulouse, all of France

[73] Assignee: Alcatel Espace, Courbevoie, France

[21] Appl. No.: 203,609

[22] Filed: Feb. 28, 1994

Related U.S. Application Data

[63] Continuation of Ser. No. 854,915, Mar. 20, 1992, abandoned.

[30] Foreign Application Priority Data

Mar. 22, 1991 [FR] France .................................. 91 03509

[51] Int. Cl.[6] .............................................. H04B 7/185
[52] U.S. Cl. ...................................... 455/13.1; 455/13.4;
455/16; 455/127; 342/354
[58] Field of Search ...................... 455/8, 9, 12.1, 13.1,
455/13.2, 13.3, 13.4, 16, 126, 127, 3.2; 333/105;
330/124 R, 295, 124 D, 126; 371/5.1, 4, 8.1, 8.2,
11.1, 11.2, 11.3; 348/21, 487; 358/723, 724;
342/352, 354

[56] References Cited

U.S. PATENT DOCUMENTS

| 4,070,637 | 1/1978 | Assal et al. ........................... 333/105 |
| 4,744,083 | 5/1988 | O'Neill et al. ......................... 371/5.1 |
| 4,755,769 | 7/1988 | Katz ................................ 330/124 R |
| 4,831,619 | 5/1989 | Rosen ............................. 330/124 R |
| 4,855,619 | 8/1989 | Maitre ............................ 330/124 R |
| 5,083,094 | 1/1992 | Forsberg ......................... 330/124 R |

OTHER PUBLICATIONS

Elektronik, vol. 34, No. 2, Jan. 1985, pp. 117-124, Munich, Germany; H. Hofmann et al.: "Aufbau und Funktionsweise von Kommunikationssatelliten".

IEEE Communications Magazine, vol. 22, No. 3, Mar. 1984, pp. 26-34, IEEE, New York, US; R. G. Gould: "Transmission standards for direct broadcast satellites".

IEEE Transactions on Broadcasting, vol. BC-28, No. 4, Dec. 1982, pp. 176-181, IEEE, New York, US; K. Waki et al.: "Operational broadcasting satellite in Japan".

Primary Examiner—Reinhard J. Eisenzopf
Assistant Examiner—Nguyen Vo
Attorney, Agent, or Firm—Sughrue, Mion, Zinn, Macpeak & Seas

[57] ABSTRACT

A direct television broadcasting satellite facility (S1, S2, S3) having at least two coverage areas (T1, T2). At the beginning of the life of the facility, with present Standards, only two satellites (S1, S2) each having two beams (F1 & F2 and F'1 & F'2) are used, each satellite having 12 channel and redundancy amplifiers for five channels. When high-definition television is subsequently introduced progressively, the amplifiers will be coupled together in parallel and in pairs, and at least one additional satellite (S3), identical to the two initial satellites, will be launched when required.

7 Claims, 3 Drawing Sheets

SATELLITE TELECOMMUNICATIONS FACILITY CAPABLE OF COVERING A PLURALITY OF COVERAGE AREAS

This is a Continuation of application Ser. No. 07/854,915, filed Mar. 20, 1992.

BACKGROUND OF THE INVENTION

The present invention relates to a satellite telecommunications facility capable of covering a plurality of distinct Earth coverage areas. In particular, it applies to the field of direct television broadcasting to a plurality of geographical coverage areas.

Known direct broadcast television satellites are provided to beam a determined number of channels to a determined Earth coverage area with satisfactory backup or redundancy.

For present television Standards, e.g. D2-MAC, one Travelling-Wave Tube (TWT) amplifier is provided per channel, the power of the amplifier currently lying in the medium range 50 watts to 130 watts.

Under these conditions, the system needs to be equipped with a certain number of replacement amplifiers used as redundancy in order to mitigate failure in any one of the power amplifiers.

From the point of view of users, it is not good enough merely to provide replacement (130-watt) amplifiers on board the satellite because the satellite may itself fail for a variety of reasons.

In order to provide almost perfect backup, it is currently necessary to provide two satellites capable of beaming the same channels to a coverage area. For example, if a satellite is to relay five D2-MAC television programs, it could itself include five TWT amplifiers (providing 130 watts per channel), and it could be associated with a backup other satellite which in turn includes another five (130-watt) TWT amplifiers.

Nowadays, it is almost essential when launching a direct broadcast television satellite for the a satellite to be capable of relaying High-Definition Television, for which marketing is currently under very active consideration, thus ensuring that the satellite is not only profitable now, but will remain so over the next few years.

The difficulty lies in the fact that future High-Definition Television requires the repeater satellite to have amplifiers providing much higher power than the amplifiers currently in use. For example, an HD-MAC Standard channel will require a high power 230-watt amplifier instead of the medium-power 130-watt amplifier which is currently sufficient for a D2-MAC Standard channel.

Current advice is to solve this problem by equipping satellites presently intended for D2-MAC channels with overdimensioned amplifiers capable of subsequently transmitting HD-MAC Standard channels.

Given the above numerical data, this means that for one coverage area, it is necessary to provide two satellites each including five 230-watt TWT amplifiers.

Therefore, given this currently-held concept, in order to cover two distinct areas, it is necessary in all to provide up to four overdimensioned satellites of this type. A drawback with this is that it requires very large investment to be made in a future market which is entirely hypothetical because it is not currently known if and when High-Definition Television will really be marketed.

SUMMARY OF THE INVENTION

An object of the invention is to remedy this drawback by providing a simpler, cheaper way of solving the problem that is based on using a system which can be modified as a function of market requirements, which, to begin with, is almost solely adapted to current market requirements, and which is capable of being subsequently modified, progressively or otherwise, as and when required by future needs due, in particular, to High-Definition Television being introduced. To this end, the invention provides a geostationary repeater satellite telecommunications facility, in particular a direct television broadcasting facility capable of covering at least two Earth coverage areas T1, T2 each of which is intended to receive determined transmission channels which may be of two types:

either a first type, e.g. D2-MAC television, requiring, on a satellite, one medium-power (e.g. 130-watt) amplifier per channel;

or a second type, e.g. HD-MAC television, requiring one amplifier per channel, which amplifier may have nearly twice as much power, e.g. 230 watts;

essentially only channels of the first type being provided to begin with, and the modifiable facility including, to begin with, at least two identical repeater satellites S1, S2 each of which is capable of covering both of the areas T1, T2 by means of multiple beams, the two identical satellites S1, S2 together being equipped with a sufficient number of medium-power (i.e. 130-watt in the above-described example) amplifiers to provide the desired redundancy as regards channels, amplifiers, and satellites, means being provided on each satellite for subsequently coupling together in parallel at least two medium-power (130-watt) amplifiers each time a channel of the second type (HD-MAC in the above-described example) is to be brought in, and, in particular, each time the redundancy requirements make it necessary, at least one additional satellite S3 identical to the initial satellites S1, S2 is put into orbit and is therefore also capable of beaming to both of the coverage areas T1, T2.

The invention can be well understood and its advantages and other characteristics appear from the following description of an embodiment given by way of non-limiting example and with reference to the accompanying diagrammatic drawings, in which:

DESCRIPTION OF A PREFERRED EMBODIMENT

Figure 1:
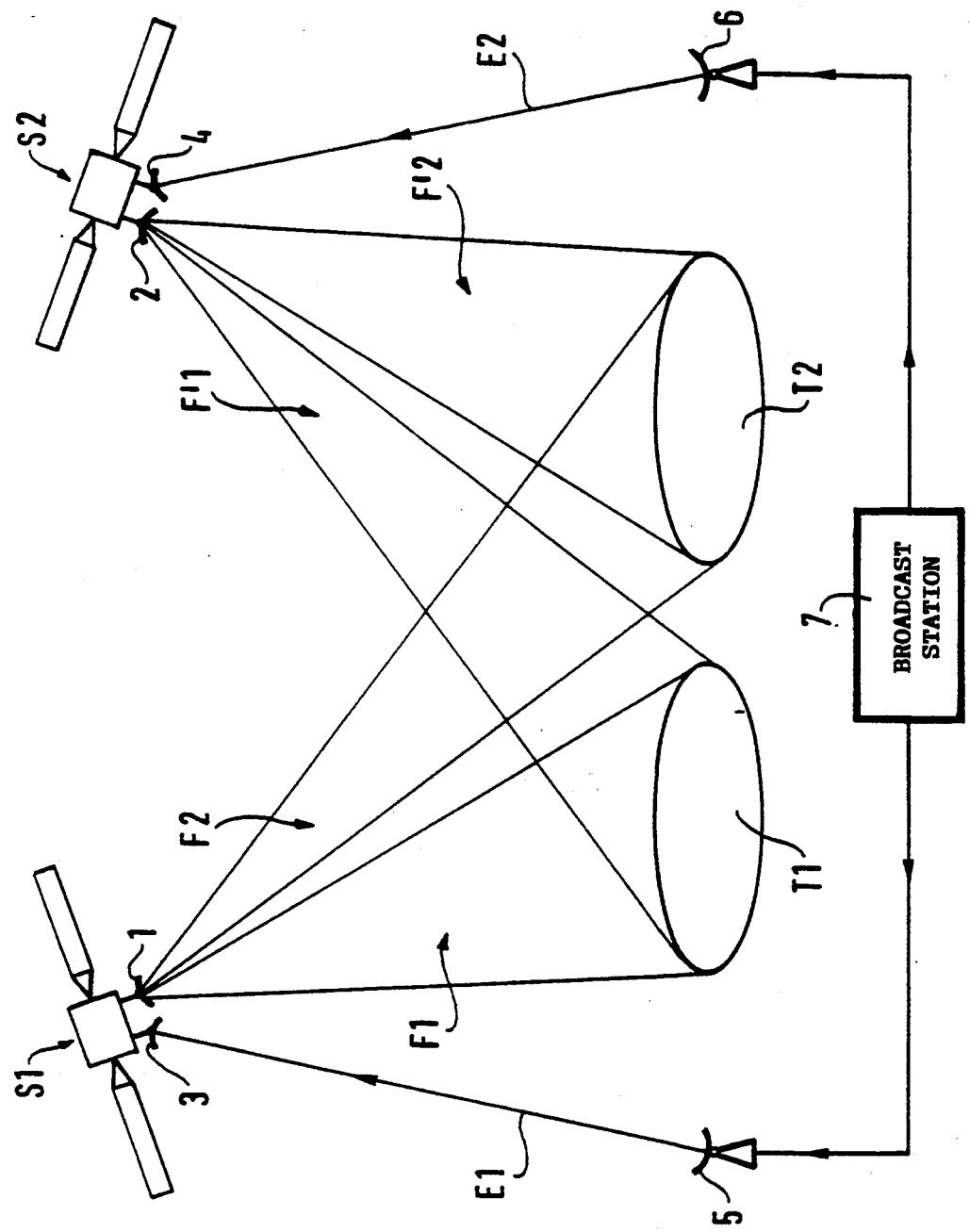
FIG. 1 shows the configuration of a facility at the beginning of its life.
Figure 2:
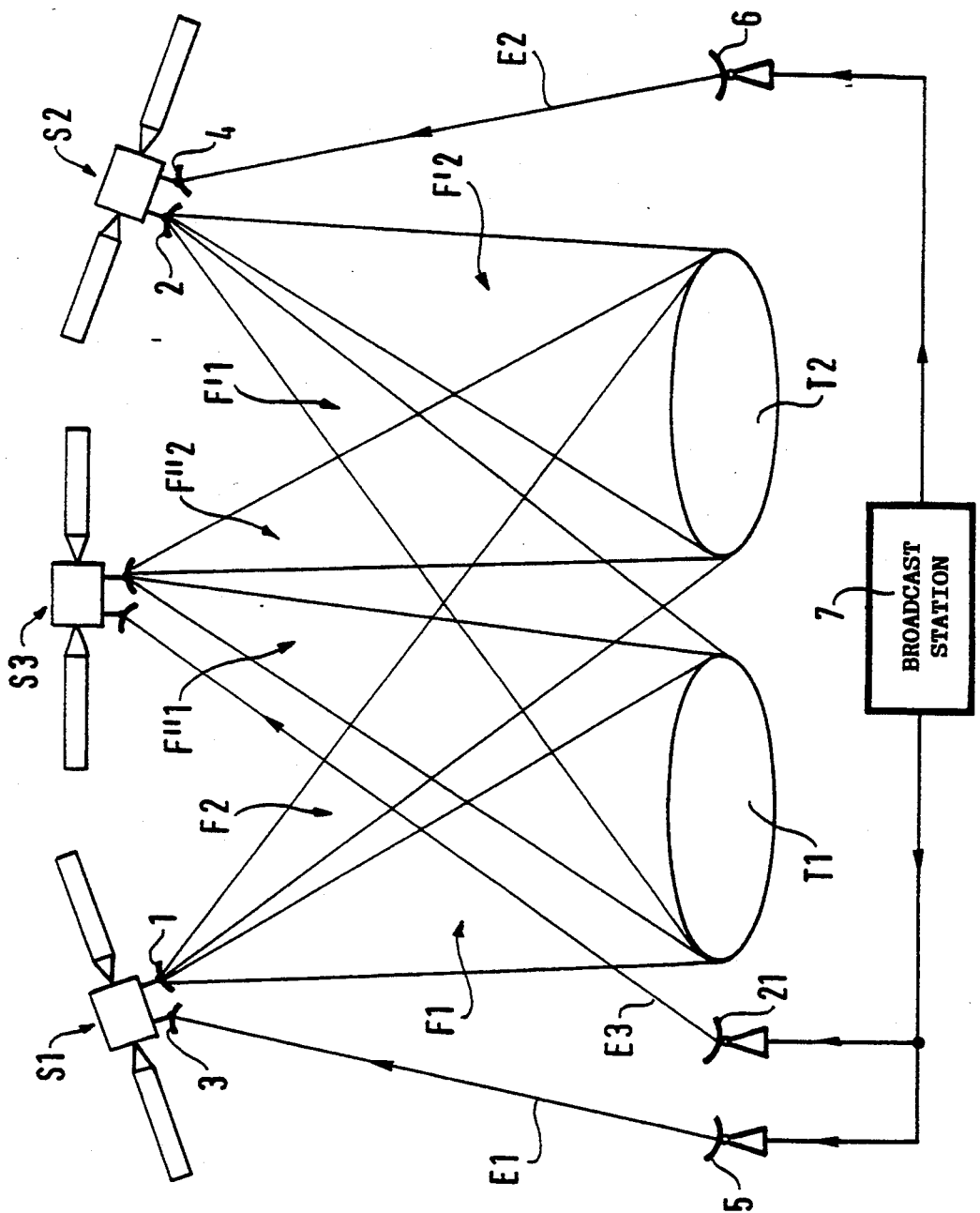
FIG. 2 shows the configuration of the same facility at the end of its life.

FIG. 1 shows a direct television broadcasting facility capable of beaming to two distinct Earth coverage areas T1 and T2. For example, at the beginning of the life of the facility, area T1 is to receive five distinct television programs corresponding to five first D2-MAC Standard channels C1 to C5, and area T2 is to receive five other distinct programs corresponding to five second D2-MAC Standard channels C6 to C10.

In this embodiment, the minimum redundancy required by users is:
one channel per channel;
one power amplifier per power amplifier; and
one satellite per satellite.

In order to meet these requirements, and by way of non-limiting example, the facility at the beginning of its life shown in FIG. 1 includes two geostationary repeater satellites S1 and S2 which are identical and which have respective retransmission antennas 1 and 2 each having two coverage areas (T1 and T2) on two distinct accesses, and each being capable of subsequently retransmitting two distinct beams:

antenna 1 of satellite S1 retransmitting a beam F1 to the area T1 of the Earth, and a beam F2 to the area T2 of the Earth; and antenna 2 of satellite S2 retransmitting a beam F'1 to the area T1, and a beam F'2 to the area T2.

Each satellite S1, S2 is equipped with a reception antenna 3, 4 which receives a multiplexed wave E1, E2 transmitted by a ground antenna 5, 6 connected to the Earth broadcast station 7.

In the starting configuration shown in FIG. 1, each satellite is equipped with twelve 130-watt TWT amplifiers, each sufficient for a D2-MAC Standard channel. For satellite S1:

five of said amplifiers are used permanently for beaming the five programs corresponding to the above-mentioned five channels C1 to C5 to coverage area T1 via beam F1;

five others are used via beam F2 as backup channels for area T2, and can therefore retransmit all or any of the five channels C6 to C10 which correspond to the five programs for coverage area T2; and the last two amplifiers, which may be omitted in another configuration but which are very useful when the facility reaches middle age as is explained below, may be used as redundancy for tubes or channels so as to make up for failure in the beam F1 or even in the backup beam F2.

In symmetrical manner, beam F'2 from satellite S2 contains the five programs of channels C5 to C10 for area T2, and beam F'1 contains the five backup channels for area T1.

At this stage, all the desired redundancies are satisfied both as regards TWTs and channels, and also as regards satellites, because if one of the satellites S1 or S2 fails, the other satellite S2 or S1 continues to beam to both of the areas T1 and T2 until the faulty satellite is repaired or until a replacement satellite is launched. In such a case, by having twelve amplifiers per satellite instead of ten, some redundancy can be maintained for tubes or channels.

Figure 3:
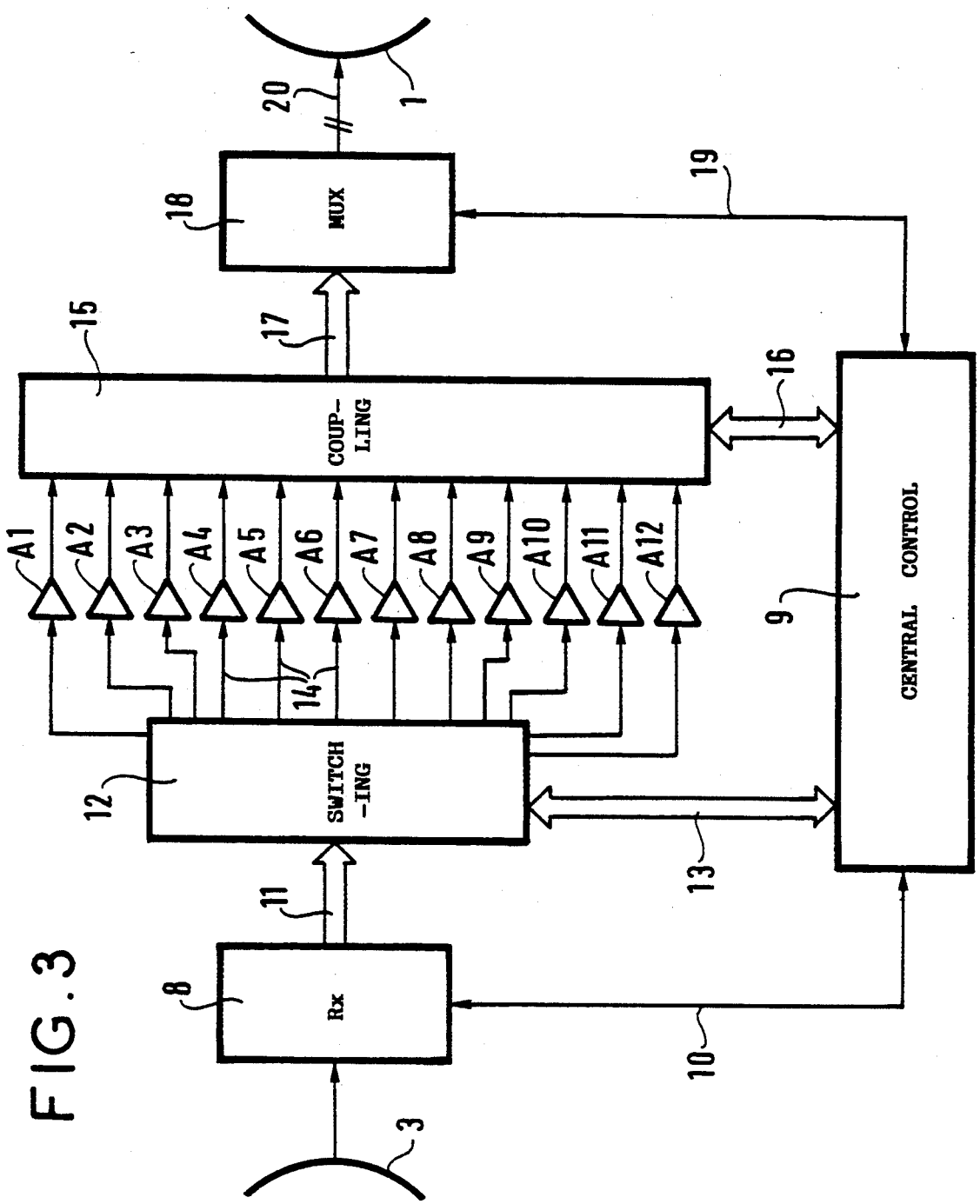
FIG. 3 is a very basic block diagram showing the electronics of one of the satellites in the facility.

As can be seen from FIG. 3, each satellite is designed so that, while in orbit, the amplifiers can be coupled together in parallel and in pairs, each such coupling using two 130-watt amplifiers to obtain a single amplifier of more than 230 watts and therefore capable of amplifying an HD-MAC High Definition Standard television channel signal.

FIG. 3 shows the reception antenna 3 of satellite S1 and its retransmission antenna 1 having two coverage areas and two distinct accesses.

The signal picked up by antenna 3 is processed by a receiving, transposing and demultiplexing device 8 which is connected to the central control member 9 of the satellite via a two-way link 10.

The device 8 is connected via the multiple link 11 to a member 12 for switching, adjusting phases and amplitudes, coupling in pairs, and pre-amplifying, which member is in turn connected to the central control member 9 via a two-way multiple link 13.

The twelve outputs 14 of the member 12 are connected to the inputs of the twelve 130-watt TWT amplifiers A1 to A12 whose respective outputs are connected to a device 15 for measuring phases and amplitudes, and for coupling in pairs, which device is in turn connected to the central control member 9 via a two-way multiple link 16.

The signals, coupled together in pairs or not, output by the device 15 are applied via the multiple link 17 to the multiplexer 18 which is connected both to the control member 9 via a two-way link 19, and also to the two-beam transmission antenna 1 via the dual link 20.

In orbit, the control member 9 receives orders from the ground station to couple and/or switch the amplifiers A1 to A12. In the case of basic switching, e.g. to replace a faulty amplifier with another amplifier, the control member merely sends instructions via the link 13 to switch microwave switches inside the device 12. In the case of a request to couple two amplifiers together in parallel (in order to obtain a high-power amplifier capable of operating for an HD-MAC Standard program), the control member measures, by means of the circuit 15 and via the link 16, the phase and amplitude relationships at the outputs of the two amplifiers, and, in the circuit 12 and via the link 13, accordingly adjusts the input amplitudes and phases suitable for enabling the two amplifiers to be coupled together in parallel.

With reference to FIG. 1, it is assumed that over time each of the five programs transmitted to each of the areas T1 and T2 respectively will change to HD-MAC High Definition Standard transmitted via channels C'1 to C'10, instead of being transmitted in D2-MAC Standard via channels C1 to C10 as was the case to begin with.

Channel C1 in beam F1 and channel C6 in beam F'2 can be replaced by the corresponding high-definition channels C'1 and C'6 very easily by coupling the eleventh and twelfth amplifier in each satellite (A11 and A12 in satellite S1 shown in FIG. 3) to the respective amplifiers (A1 and A6 for satellite S1) which correspond to the channels to be replaced, respectively the channel normally transmitted and the backup channel for the other area. In this way, by means of a single coupling operation, a structure is obtained having two areas, each of which is covered by four conventional D2-MAC Standard programs and one new HD-MAC Standard program, with the desired redundancy satisfied in all respects.

In order to pursue this adaptation, i.e. to replace another old D2-MAC Standard program in each zone by a new HD-MAC Standard program, it is necessary, in the FIG. 3 facility and at least if the same redundancies are to be satisfied, to launch a third satellite S3 identical to the satellites S1 and S2 already in orbit, which third satellite is fed with a wave E3 by a transmission antenna 21 on the Earth and is capable of retransmitting two beams F"1 and F"2 towards areas T1 and T2. For example, the two beams F"1 and F"2 are used to carry backup channels, but all configurations are naturally possible, provided that the redundancy conditions desired by users are ultimately satisfied.

By way of non-limiting example, by the end of its life the FIG. 3 facility will transmit high-definition HD-MAC programs only, and for example:

beam F1 will carry two transmission channels to area T1;

beam F2 will carry three transmission channels to area T2;

beam F'1 will carry three transmission channels to area T1;

beam F'2 will carry two transmission channels to area T2;

beams F"1 and F"2 will carry backup channels only, e.g. three each; and the high-power amplifier remaining on each of satellites S1 and S2 will then be a backup amplifier or channel.

Naturally, this distribution will be reworked during the life of the facility under the control of the Earth station 7 as a function of incidents and requirements.

Naturally the invention is not limited to the above-described embodiment, and in particular, the numbers of Earth coverage areas, retransmitted beams per satellite, amplifiers and channels at the beginning and end of life, and satellites at the beginning and end of life are in no way limited and will be adapted to requirements.

What is claimed is:

1. In a satellite telecommunications system for direct television broadcasting, covering two different Earth coverage areas with two different respective sets of predetermined transmission channels, wherein each of the coverage areas selectively receives transmission channels of the following two types:

a first type requiring, on each of two communication satellites, one medium-power amplifier (A1, or A2, ..., or A12) per transmission channel; and a second type requiring, on said each satellite and per channel, one higher-power amplifier having approximately twice as much power as said medium-power amplifier;

the improvement wherein said system comprises:

a first operational communication satellite (S1) normally continuously operating to cover only a first coverage area (T1) with only a first set of a number of predetermined transmission channels via a first satellite first beam (F1), and only redundantly operating also to cover a second, different coverage area (T2) with a second, different set of said number of predetermined transmission channels via a first satellite second beam (F2); and a second operational communication satellite (S2), identical to said first operational communication satellite (S1), normally continuously operating to cover only said second coverage area (T2) with only said second, different set of said number of predetermined transmission channels via a second satellite first beam (F'2), and only redundantly operating also to cover said first coverage area (T1) with a second satellite second beam (F'1), each of said first (S1) and second (S2) operational communication satellites operating redundantly only when the other becomes inoperative, neither of said first and second operational communication satellites being an idle, spare satellite, each of said first and second operational communication satellites having a plurality of first medium-power amplifiers, equal in number to said number of predetermined transmission channels one of which is associated with each of the predetermined transmission channels of said first set of predetermined channels, and having a plurality of second medium-power amplifiers, one of which is associated with each of the predetermined transmission channels in said second set of predetermined channels, said second medium power amplifiers being equal in number to said first medium-power amplifiers; and coupling means (9, 15, 12) on said each operational communication satellite for selectively coupling in parallel a pair of said first and second medium-power amplifiers to form a higher power amplifier in said first operational communication satellite, and a corresponding pair of said first and second medium-power amplifiers to form a higher power amplifier in said second operational communication satellite, each time a predetermined channel of the second type is to be received.

2. The system according to claim 1, characterized in that, at least one additional third operational communication satellite (S3), identical to said first and second operational communication satellites (S1, S2), is included in the system.

3. The system according to claim 2, characterized in that said coupling means (9, 15, 12) enable each operational communication satellite to retransmit said first and said second sets of said predetermined transmission channels within each of its multiple beams to either of said first and second coverage areas (T1, T2).

4. The system according to claim 1, wherein the total number of said first and second medium-power amplifiers (A1, A2, ..., A12) in each of said first and second operational communication satellites is equal to or greater than twice said number of predetermined transmission channels in each of said first and second sets of predetermined transmission channels.

5. The system of claim 1 wherein each of said first and second medium power amplifiers is in the range of 50 watts to 130 watts.

6. The system according to claim 1, wherein:

said high powered amplifier is greater than 230 watts;

said first type of transmission channel is a D2-MAC Standard channel; and said second type of transmission channel is a High-Definition MAC Standard Channel.

7. The system according to claim 1, characterized in that said coupling means (9, 15, 12) enable each operational communication satellite to retransmit said first and said second sets of said predetermined transmission channels within each of its multiple beams to either of said first and second coverage areas (T1, T2).

* * * * *